United States Patent [19]

Yuunaga

[11] Patent Number: 5,009,686
[45] Date of Patent: Apr. 23, 1991

[54] AIR CLEANER OF ENGINE FOR VEHICLE

[75] Inventor: Toshifumi Yuunaga, Wakabayashi, Japan

[73] Assignee: Suzuki Jidosha Kogyo Kabushiki Kaisha, Shizuoka, Japan

[21] Appl. No.: 354,763

[22] Filed: May 22, 1989

[30] Foreign Application Priority Data

May 24, 1988 [JP] Japan .................................. 63-126797

[51] Int. Cl.⁵ ................................................ B01D 46/00
[52] U.S. Cl. .......................................... 55/419; 55/510
[58] Field of Search ................................ 55/418–420, 55/497, 510, 421; 123/556

[56] References Cited

U.S. PATENT DOCUMENTS

| | | | |
|---|---|---|---|
| 2,781,032 | 2/1957 | Sebok et al. | 123/556 |
| 3,513,817 | 5/1970 | Kearsley | 55/510 X |
| 3,563,007 | 2/1971 | Clarke | 55/419 X |
| 4,261,717 | 4/1981 | Belore et al. | 55/419 |
| 4,273,564 | 6/1981 | Sugie et al. | 55/419 |

*Primary Examiner*—Bernard Nozick
*Attorney, Agent, or Firm*—Laubscher, Presta & Laubscher

[57] ABSTRACT

There is disclosed an air cleaner of an engine for a vehicle. The air cleaner shaped by fitting upper and lower cases together includes an air intake unit inclined downwards so that a cylindrical part, provided at the top end of the air intake unit, for joining an air valve is disposed in a relatively lower position than the air intake unit. During a process of airtightly fitting the upper and lower cases, this arrangement restrains an engine overall height to a low value and prevents fluctuations in sectional area of the air intake unit which are due to reconstruction of the air intake unit to eliminate the difficulty caused particularly in a portion for joining the air valve to the air intake unit.

1 Claim, 2 Drawing Sheets

AIR CLEANER OF ENGINE FOR VEHICLE

BACKGROUND OF THE INVENTION

1. Field of the Invention:

The present invention is directed to an improvement of an air cleaner of an engine for a vehicle.

2. Description of the Prior Art:

An engine mounted on a vehicle is typically equipped with an air cleaner for cleaning the air sucked.

The great majority of such air cleaners are each provided with a hot air intake mechanism for sucking the air warmed up by an exhaust manifold in the cold atmosphere. One typical structure of these conventional air cleaners will be described with reference to FIGS. 4 through 6. FIG. 4 is a plan view of the air cleaner. The numeral 1 designates the air cleaner. A duct-like air intake unit 2 is intended to suck in the air which will in turn be fed to air cleaner 1. The numeral 3 represents a known air valve for effecting change-over of suction passageways between the warmed air and the atmosphere. The air valve is linked to the air intake unit. The linkage therebetween involves a variety of fashions in terms of a structure of a case of the air cleaner. The air cleaner case is composed of an upper and lower cases which are fitted together; and commonly the air intake unit is also formed integrally therewith. The fitting portion between the upper and lower cases undergoes airtight processing in order to keep the airtightness of an air passageway of the air cleaner. On the other hand, an outlet tube of the air valve assumes a cylindrical configuration, and it is required that the fitting portion be formed to take the cylindrical shape adaptive to the fitting in the air suction passageway for keeping the airtightness. For this reason, the end of air intake unit is, as a matter of fact, formed to assume the cylindrical shape. In this case, parts other than the cylindrical top of the air intake unit are shaped generally by fitting the upper and lower cases together, and hence the maintaining of the airtightness entails a special structure in the joining portion. This kind of special structure will be explained in conjunction wit FIGS. 5 and 6.

Turning first to FIG. 5, a lower case 4 fringe close to warm air valve 3 is partially swollen (referred to as a swelling 9), while upper case 5 assumes a configuration corresponding to swelling 9. In this manner, lower case 4 is formed with swelling 9, whereby upper and lower cases 5 and 4 can be airtightly fitted to each other.

Referring next to FIG. 6, a lower case 4 fringe positioned closely just under air valve 3 is recessed (referred to as a recess 10), while upper case 5 assumes a configuration corresponding to recess 10. Upper and lower cases 5 and 4 can be airtightly fitted to each other. Note that in FIGS. 5 and 6 the numeral 11 designates a valve body of air valve 3, the numeral 12 represents an air hose, and 13 indicates a cylinder head.

The structure depicted in FIG. 5, however, presents a problem in which there is shaped a portion a whose interior area is sharply enlarged in the middle of the air intake unit, and the air stagnates in portion a to cause disturbance of an air flow, resulting in generation of sucking sounds. Whereas in the structure of FIG. 6, the middle of the air intake unit is formed with a portion a' the interior area of which is sharply narrowed. As a result, there arise such problems that a suction resistance augments in portion a', which in turn tends to cause a drop in output of the engine and the generation of the sucking sounds.

Both of the structures depicted in FIG. 5 and 6 have disadvantages in terms of layout of the engine and a suction efficiency of hot air, because there increase a positional height of air valve and an engine overall height H as well, and additionally a length of arranged air hose 12 becomes large.

Accordingly, it is a primary object of the present invention to provide an air cleaner for a vehicle which obviates the above-described defects.

It is another object of the present invention to provide an improved air cleaner arranged such that an engine overall height is reduced.

SUMMARY OF THE INVENTION

To accomplish the foregoing objects, there is provided an air cleaner of an engine for a vehicle, comprising: an air valve; and an air intake unit including a cylindrical part for joining the air valve, characterized in that an inclined portion is formed on the cylindrical part of the air intake unit and/or in the vicinity of the cylindrical part so that a central point of an opening formed in the top end of the cylindrical member is positioned under a horizontal plane passing through the center of a vertical diameter of the air intake unit.

Based on this construction, sectional areas of the air valve, the cylindrical part and the air intake unit are kept substantially equal, thereby preventing generation of strange sounds when sucking the air. The air valve is disposed in a relatively low position with respect to the air cleaner, whereby an increase in engine overall height can be restrained. This arrangement permits a reduction in length of a pipe connected to an exhaust manifold. A suction efficiency of warm air can thus be ameliorated.

BRIEF DESCRIPTION OF THE DRAWINGS

Other objects and advantages of the invention will become apparent during the following discussion in conjunction with the accompanying drawings, in which:

FIG. 1 is a side view illustrating the principal portion of an air cleaner according to the present invention;

FIG. 2 is a plan view thereof;

FIG. 3 is a sectional view taken substantially along the line I—I of FIG. 2;

FIG. 4 is a plan view showing an example of the prior art;

FIG. 5 is a sectional view taken substantially along the line of FIG. 4, depicting a state where a lower case disposed in the vicinity of an air intake unit is formed with a swelling to which an upper case is fitted; and FIG. 6 is a side sectional view, similar to FIG. 5, depicting a state where the lower case disposed in the vicinity of a cylindrical part of the air intake unit is formed with a recess in which the upper case is fitted.

DETAILED DESCRIPTION OF THE PREFERRED EMBODIMENT

Figure 1:
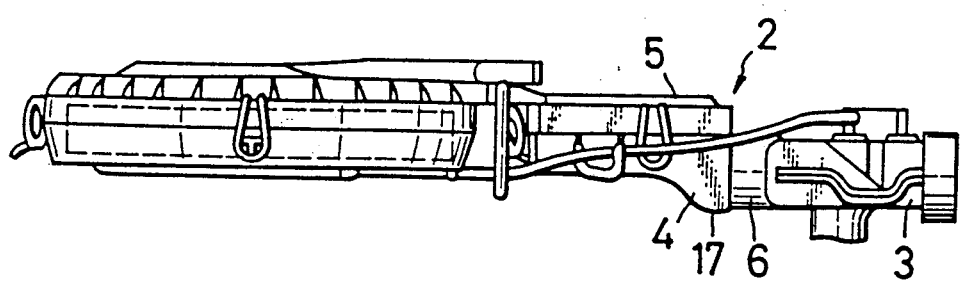
FIGS. 1 to 3 in combination show an illustrative embodiment of the present invention.
Figure 2:
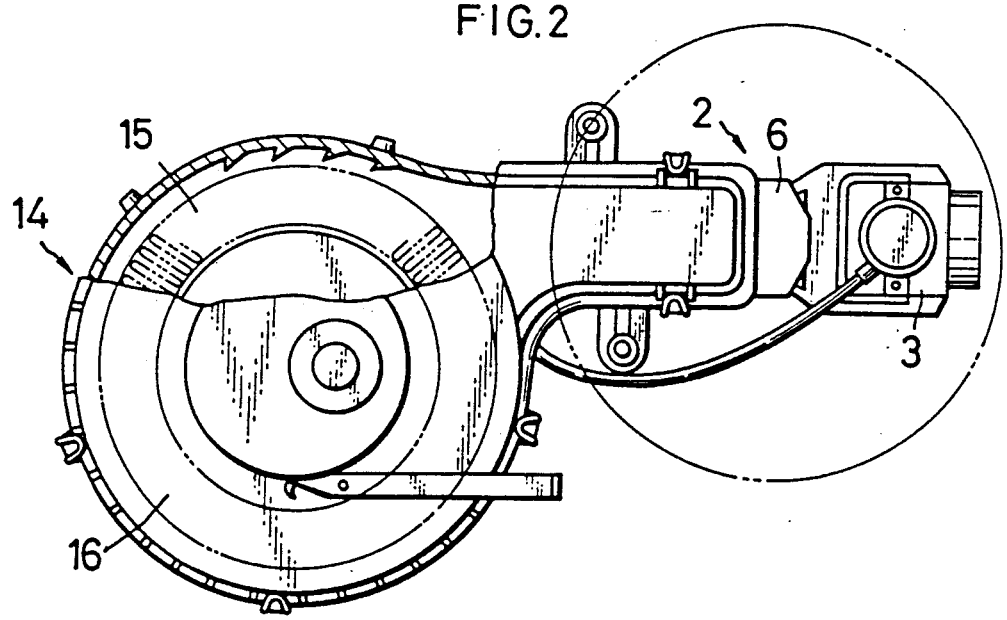
Figure 3:
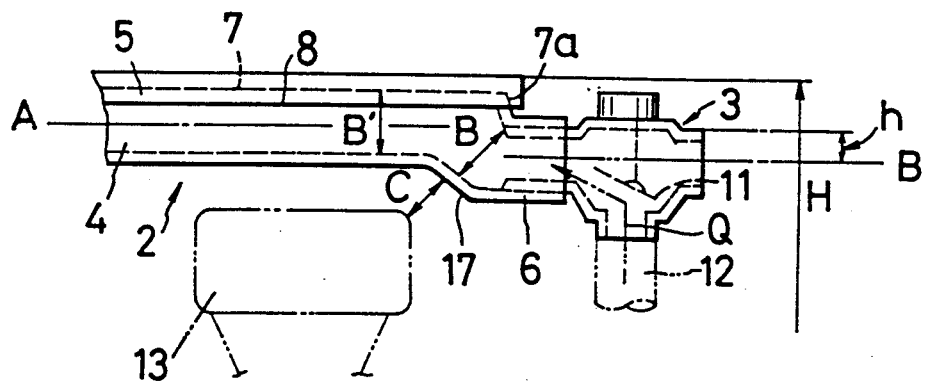
Figure 4:
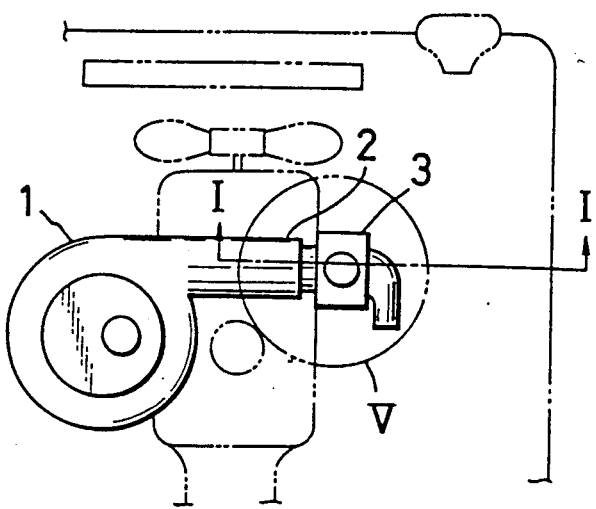
FIGS. 4 to 6 show an example of the prior art.
Figure 5:
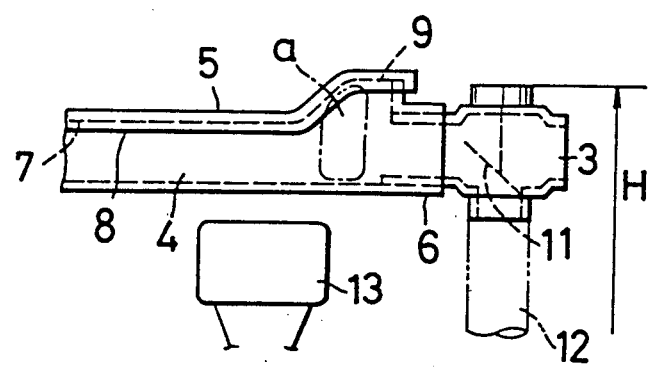
Figure 6:
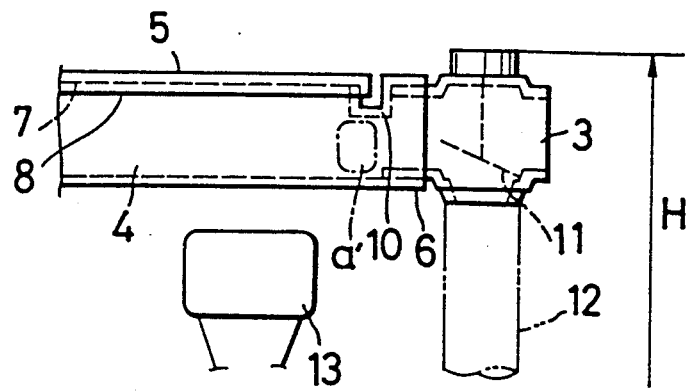

One illustrative embodiment of the present invention will hereinafter be described in detail wit reference to FIGS. 1 through 3. Note that the same components as those of the prior art are marked with the like symbols.

An improved air cleaner in accordance with the present invention comprises a case 14 composed of an upper case 5 and a lower case 4 having a cylindrical part 6 for joining an air valve 3 to an air intake unit 2, the upper and lower cases being fitted together. With this arrangement, the components ranging from a body 16 incorporating a filter element 15 to air intake unit 2 are formed into one united body.

Formed on upper and lower cases 5 and 4 are fringes 7 and 8 through which the two cases are airtightly fitted to each other. An inclined portion 17 is obliquely shaped downwards at a predetermined angle, extending from an edge 7a of lower case 4 which is close to air valve 3 to cylindrical part 6. When setting the air cleaner in an engine room, inclined portion 17 is positioned at the end portion of a cylinder head 13, and cylinder head 13 is spaced at a given distance C away from the air cleaner.

A sectional area B of inclined portion 17 of air intake unit 2 is equalized to a sectional area B' of other portion of air intake unit 2. Air valve 3 secured to cylindrical part 6 is positioned so that a central axial line $\beta$ of cylindrical part 6 is lower by h than a central horizontal plane A of the air intake unit in association with inclined portion 17. Hence, the air valve is arranged lower by h than that of the prior art.

On the basis of the above-described constitution, the air sucked in cylindrical part 6 via air valve 3 is fed from air intake unit 2 to body 16. The sectional areas of air intake unit 2, inclined portion 17 and cylindrical part 6 are kept equal to each other, and hence any disturbance of an air flow does not take place as well as causing no resistance in suction. Where air valve 3 is changed over to a warm air hose 12, the air passing through air intake unit 2 of the air cleaner from warm air hose 12 temporarily impinges on a valve 11 of warm air valve 3 to change its direction. Subsequently, the air flows to air intake unit 2. In this case, an angle of inclination of valve 11 is substantially equal to an angle of inclined portion 17, so that the flow of air introduced from warm air hose 12 is, as indicated by an arrow of FIG. 3, moderately turned at air valve 3. For this reason, a difference in resistance between cool air suction and warm air suction can be almost ignored. Consequently, there is produced almost no air stagnation incidental to the air suction and no increment in suction resistance. Besides, the generation of sucking sounds and also a drop in engine output can be restrained.

Air valve 3 can be installed lower than in the prior art, and an engine overall height H in the case of adopting an air cleaner topped structure can be decreased. This arrangement in turn permits a reduction in length of air hose 12. Upper and lower cases 5 and 4 can be simplified in configuration as compared with the conventional example, thereby readily obtaining the airtightness between upper and lower cases 5 and 4.

The above-mentioned embodiment has dealt with an arrangement that the cylindrical part of the air intake unit is placed in the horizontal direction. If the cylindrical part itself is formed with an inclined portion, the same effects can be exhibited. In this case, as a matter of course, the feed valve on the side of the air valve has an angle of inclination.

Although the illustrative embodiment of the present invention has been described in detail with reference to the accompanying drawings, it is to be understood that the invention is not limited to this precise embodiment. Various changes or modifications may be effected therein by one skilled in the art without departing from the scope or spirit of the invention.

What is claimed is:

1. An air cleaner of an engine of a vehicle, comprising:
   an upper case;
   a lower substantially cylindrical case fitted to said upper case;
   an air valve; and
   an air intake on said lower case having a cylindrical part extending horizontally and joining said air valve;
   said air intake including an inclined portion, said inclined portion extending from the lower edge of said lower case and the upper edge of said lower case, so that a central point of an opening formed in said cylindrical part is positioned lower than a horizontal plane passing through the center of said lower case, the cross sectional area of said inclined portion being substantially the same as the cross sectional area of said cylindrical part adjacent said inclined portion to facilitate air flow through said air intake.

* * * * *